(12) United States Patent
Belfer

(10) Patent No.: US 6,636,686 B1
(45) Date of Patent: Oct. 21, 2003

(54) BRAIDED OPTICAL FIBER BUNDLES

(76) Inventor: Bruce D. Belfer, 1703 Valley Rd., Ocean, NJ (US) 07712

( * ) Notice: Subject to any disclaimer, the term of this patent is extended or adjusted under 35 U.S.C. 154(b) by 0 days.

(21) Appl. No.: 09/224,460

(22) Filed: Dec. 31, 1998

(51) Int. Cl.[7] .................................................. G02B 6/04
(52) U.S. Cl. ....................... 385/901; 385/104; 385/106; 385/115; 362/554; 362/556; 362/559
(58) Field of Search ................................. 385/901, 115, 385/116, 120, 121, 124, 100–114, 39, 48; 362/554, 556, 559

(56) References Cited

U.S. PATENT DOCUMENTS

| | | | |
|---|---|---|---|
| 5,345,531 A | * | 9/1994 | Keplinger et al. ........... 385/102 |
| 5,568,964 A | * | 10/1996 | Parker et al. ................. 362/32 |
| 5,995,702 A | * | 11/1999 | Tjonneland ................. 385/901 |

\* cited by examiner

Primary Examiner—Frank G. Font
Assistant Examiner—Michael P. Mooney
(74) Attorney, Agent, or Firm—Ezra Sutton

(57) ABSTRACT

A fiber optic light-emitting panel having one or more braided fiber optic strand assemblies formed into a light-transmitting device. The fiber optic light-emitting panel includes a plurality of three or more fiber optic strands braided together to form a braided fiber optic strand assembly. Each of the fiber optic strands includes a single optical fiber or a plurality of optical fibers to form a bundle. Each of the fiber optic strands within the braided fiber optic strand assembly has at least three (3) bends per inch along the length thereof for transmitting light laterally at the bends to form the light-transmitting device. The fiber optic light-emitting panel includes plastic ties for connecting at least two (2) of the braided fiber optic strand assemblies to form the fiber optic light-emitting panel. The fiber optic light-emitting panel further includes a light pump having a light source for applying an optical light signal to the braided strand assemblies for transmitting light from the bends of the fiber optic light-emitting panel.

28 Claims, 7 Drawing Sheets

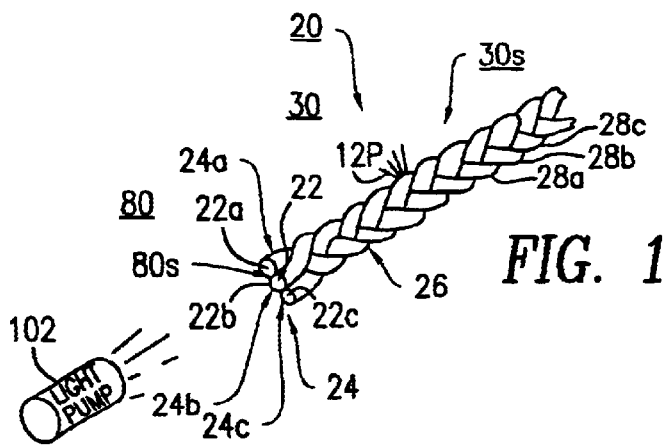
*FIG. 1*
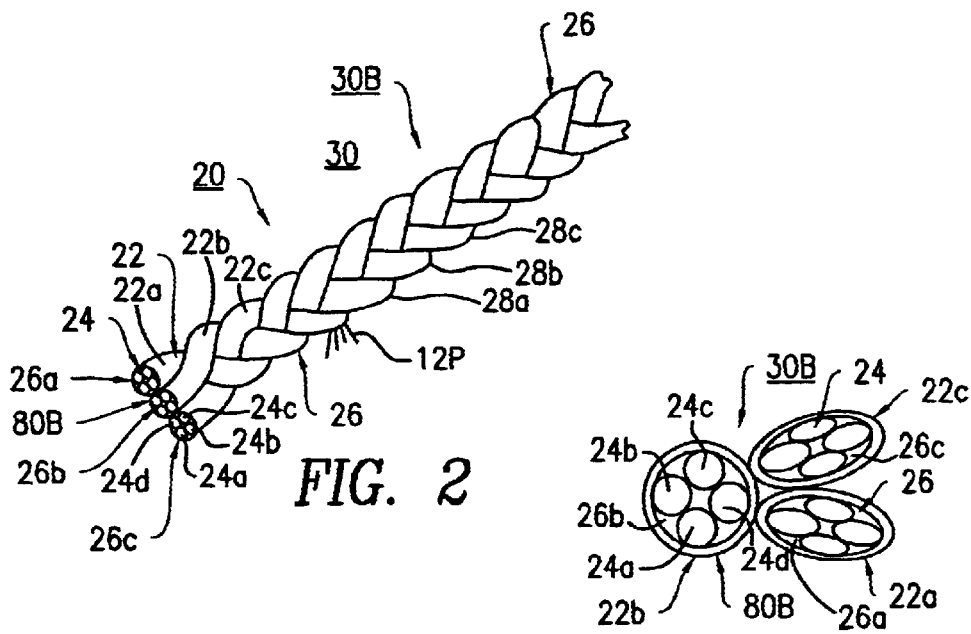
*FIG. 2*
*FIG. 4*
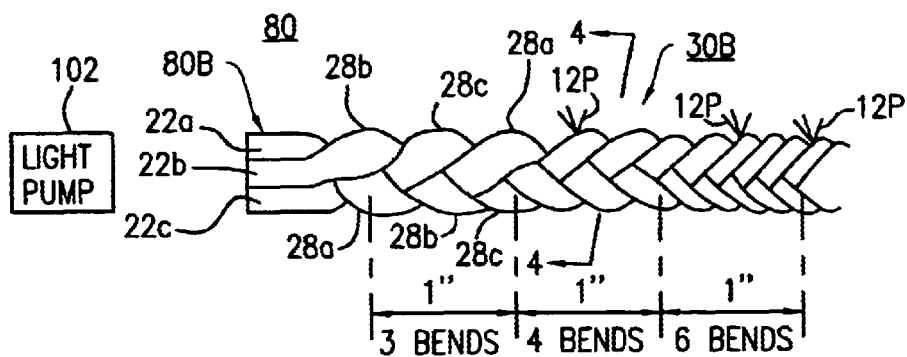
*FIG. 3*

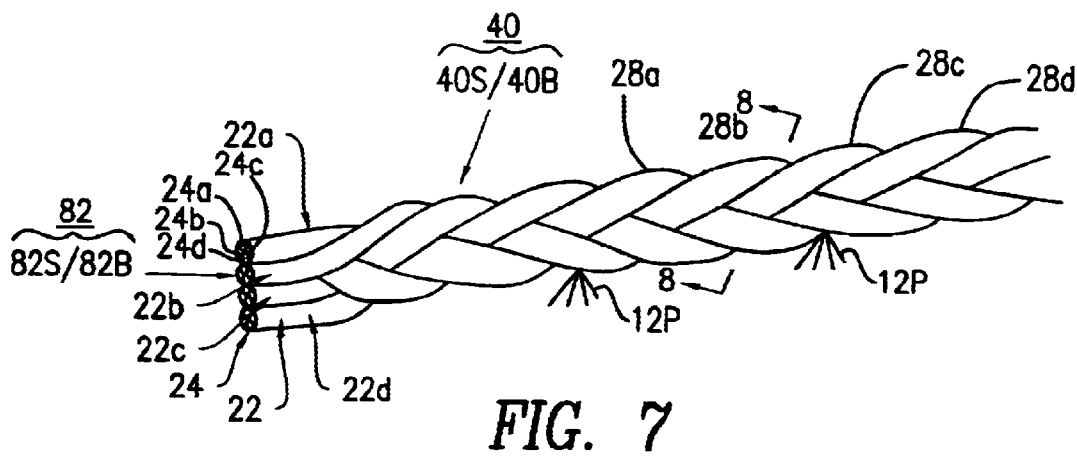
FIG. 7
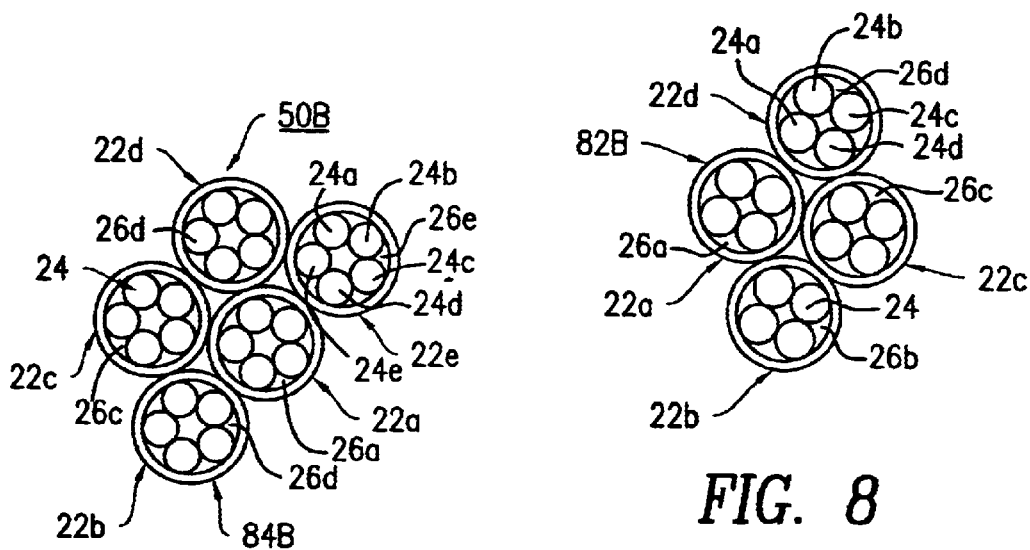
FIG. 10
FIG. 8
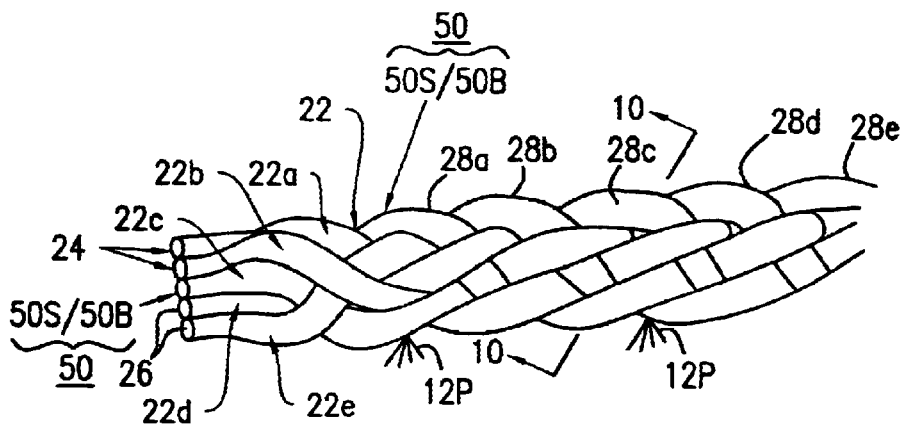
FIG. 9

BRAIDED OPTICAL FIBER BUNDLES

FIELD OF THE INVENTION

The present invention relates to a fiber optic light-emitting panel having braided optical fiber bundles formed into a sheet. More particularly, the fiber optic light-emitting panel is made luminous by bending the optical fibers along their length within the braided optical fiber bundles such that more light is emitted at the bends. In addition, braiding of the fibers produces more emitted radiant light along their length within the panel than weaving or twisting of the optical fiber bundles.

BACKGROUND OF THE INVENTION

In the prior art it is known to weave optical fibers and form a light-emitting panel to make the panel luminous in one or more selected areas by nullifying the total internal reflection characteristics of the optical fibers in such areas. Illumination in these selected areas is caused by allowing light which is transmitted to the woven optical fibers through a cable from a remote light source to emerge from the optical fibers in these selected areas.

There is a limit to the amount of light that can be emitted along the length of the woven or twisted optical fibers within the panel, such that the light that is not emitted from the panel is trapped in the optical fibers and becomes wasted energy. Weaving or twisting of the optical fibers within the panel does not exceed the minimum bend radius of the optical fibers, thus a minimum of light is emitted from the woven or twisted optical fibers from within the panel. In addition, weaving or twisting of the optical fibers within the panel does not provide as much controlled leakage of light over the entire length of the woven or twisted optical fibers within the light-emitting panel. It would be desirable to increase the amount of light that can be emitted from the bends in each of the optical fibers within the bundle in order to increase the efficiency of the light-emitting panel.

There remains a need to improve the uniformity and efficiency of the light being emitted from such fiber optic panels. The panel will increase its efficiency of light emission from each of the optical fibers within the bundle by braiding three or more optical fibers within the bundle in order to increase the number of bends of the optical fibers to emit more light from the panel.

DESCRIPTION OF THE PRIOR ART

Fiber optic light-emitting panels with woven or twisted optic fiber bundles formed into a sheet having various designs, structures and configurations have been disclosed in the prior art. For example, U.S. Pat. No. 5,021,928 discloses a flat panel illumination system using light-emitting optical fibers that are woven.

U.S. Pat. No. 5,608,742 discloses a laser with optical fibers coupled to a diode pump source that produces a depolarized pump beam. This prior art patent does not teach the braiding of optical fibers to form a fiber optic light-emitting panel.

U.S. Pat. No. 4,885,663 discloses a fiber optic light-emitting panel using woven or twisted optical fibers to produce the light-emitting panel. This prior art patent does not teach the braiding of optical fibers to form a fiber optic light-emitting panel.

U.S. Pat. No. 4,907,132 discloses a fiber optic light-emitting panel using woven optical fibers to produce the light-emitting panel. This prior art patent does not teach the braiding of optical fibers to form a fiber optic light-emitting panel.

U.S. Pat. No. 4,891,511 discloses a fiber optic microbend sensor using three (3) or more interwoven optical fibers. This prior art patent does not teach the braided structure of the present invention for forming a sheet to produce light from a fiber optic light-emitting panel.

U.S. Pat. No. 5,569,242 discloses a medical device for treating collagen using phosphor-coated optical fibers for use in a temperature sensor. This prior art patent does not teach the use of phosphorous-coated cladding of the braided optical fibers to produce a brighter light with a glowing effect within the fiber optic light-emitting panel.

None of the prior art patents teach or disclose the braiding of optical fibers within a fiber optical bundle or forming the bundle into a sheet for the purpose of emitting more light or leaking more light from a fiber optic light-emitting panel as compared to woven or twisted optical fiber bundles. In addition, none of the prior art patents teach or disclose the use of phosphor(ous)-coated cladding of the braided optical fibers to produce a brighter light with a glowing effect when the light is leaked along the path of the braided optical fibers within the bundle.

Accordingly, it is an object of the present invention to provide a fiber optic light-emitting panel having braided optical fiber bundles formed into a sheet in order to increase the amount of light emitted from each of the braided optical fibers within the bundle to provide an increase in efficiency of the light-emitting panel.

Another object of the present invention is to provide a fiber optic light-emitting panel having braided optical fiber bundles therein in order to produce a more luminous panel by bending the optical fibers along their length within the braided optical fiber bundles such that more light is emitted at the bends.

Another object of the present invention is to provide a fiber optic light-emitting panel having three (3) or more braided optical fibers within the optical fiber bundle in order to increase the light efficiency of light emissions from each of the bent optical fibers within the bundle.

Another object of the present invention is to provide a fiber optic light-emitting panel in which the frequency of bends of the optical fibers is in the range of three (3) to six (6) bends per inch of optical fiber.

Another object of the present invention is to provide a fiber optic light-emitting panel having a more uniform and directed amount of light being emitted in the X, Y and Z axis at each of the bends within the braided optical fiber bundles which produces a higher light output.

Another object of the present invention is to provide a fiber optic light-emitting panel in which the light output attenuation can be made relatively more uniform over substantially the entire length of the braided optical fibers by increasing the number of bends per inch in each optical fiber as the distance from the light source increases.

Another object of the present invention is to provide a fiber optic light-emitting panel having phosphorous-coated cladding of the braided optical fibers to produce a brighter light with a glowing effect when the light is leaked at each of the bends along the path of the braided optical fibers within the bundle of the light-emitting panel.

A further object of the present invention is to provide a fiber optic light-emitting panel having braided optical fibers for use as backlighting in museums, theaters, movies, art galleries, playhouses, sport arenas, concert halls, amphitheaters, and the like, as well as a replacement for neon signs and other signs for buildings, roads, airports, and the like.

A still further object of the present invention is to provide a fiber optic light-emitting panel having braided optical fiber bundles formed into a sheet that can be mass produced in an automated and economical manner and is readily affordable by the user.

SUMMARY OF THE INVENTION

In accordance with the present invention there is provided a fiber optic light-emitting panel having one or more braided fiber optic strand assemblies formed into a light-transmitting device. The fiber optic light-emitting panel includes a plurality of three or more fiber optic strands braided together to form a braided fiber optic strand assembly. Each of the fiber optic strands includes a single optical fiber or a plurality of optical fibers to form a bundle. Each of the fiber optic strands within the braided fiber optic strand assembly has at least three (3) bends per inch along the length thereof for transmitting light laterally at the bends to form the light-transmitting device. The fiber optic light-emitting panel includes plastic ties for connecting at least two (2) of the braided fiber optic strand assemblies to form the fiber optic light-emitting panel. The fiber optic light-emitting panel further includes a light pump having a light source for applying an optical light signal to the braided strand assemblies for transmitting light from the bends of the fiber optic light-emitting panel.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 1 is a front perspective view of the braided fiber optic strand assembly of the preferred embodiment of the present invention showing three optic fiber strands braided together with each optic fiber strand having a plurality of bend section area along the length of each optic fiber strand thereof for transmitting light beams laterally and outwardly at each of the bend section area locations;

FIG. 2 is a top plan view of the braided fiber optic strand assembly of the preferred embodiment of the present invention showing three optic fiber strands, each in the form of a single optical fiber braided together, with each optical fiber having a plurality of bend section areas along the length of each of the single optical fibers thereof for transmitting light beams laterally and outwardly at each of the bend section area locations;

FIG. 3 is a top plan view of the braided fiber optic strand assembly of the preferred embodiment of the present invention showing three optic fiber strands each in the form of a bundle braided together with each optic fiber strand having a plurality of bend section areas along the length of each optic fiber strand thereof for transmitting light beams laterally and outwardly at each of the bend section area locations;

FIG. 4 is an enlarged cross-sectional view of the braided fiber optic bundle assembly of the preferred embodiment of the present invention taken along lines 4—4 of FIG. 3 showing the interrelationship of the three fiber optic bundles in their braided configuration;

FIG. 7 is a front perspective view of the braided fiber optic strand assembly of the first alternate embodiment of the present invention showing four optic fiber strands braided together each in the form of a bundle with each optic fiber strand having a plurality of bend section areas along the length of each optic fiber strand thereof for transmitting light beams laterally and outwardly at each of the bend section area locations;

FIG. 8 is an enlarged cross-sectional view of the braided fiber optic strand assembly of the first alternate embodiment of the present invention taken along lines 8—8 of FIG. 7 showing the interrelationship of the four fiber optic strands in their braided configuration;

FIG. 9 is a front perspective view of the braided fiber optic strand assembly of the second alternate embodiment of the present invention showing five optic fiber strands braided together each in the form of a bundle with each optic fiber strand having a plurality of bend section areas along the length of each optic fiber strand thereof for transmitting light beams laterally and outwardly at each of the bend section area locations;

FIG. 10 is an enlarged cross-sectional view of the braided fiber optic strand assembly of the second alternate embodiment of the present invention taken along lines 10—10 of FIG. 9 showing the interrelationship of the five fiber optic strands in their braided configuration;

FIG. 15 is a front perspective view of the fiber optic light-emitting panel of the preferred embodiment of the present invention showing the power supply, the light pump having a light source, the fiber optic light-emitting panel having braided fiber strand assemblies therein, a plurality of lighting fixtures, all being used as a backlighting system for a museum, art gallery, a playhouse and the like;

FIG. 16 is a front perspective view of the fiber optic light-emitting panel of the preferred embodiment of the present invention showing the power supply, the light pump having a light source, the fiber optic light-emitting panel having braided fiber strand assemblies therein, a plurality of lighting fixtures, all being used as a backlighting system for an orchestra pit in a concert hall, an opera house, a theater and the like.

DETAILED DESCRIPTION OF THE PREFERRED AND ALTERNATE EMBODIMENTS

Overview

Figure 12:
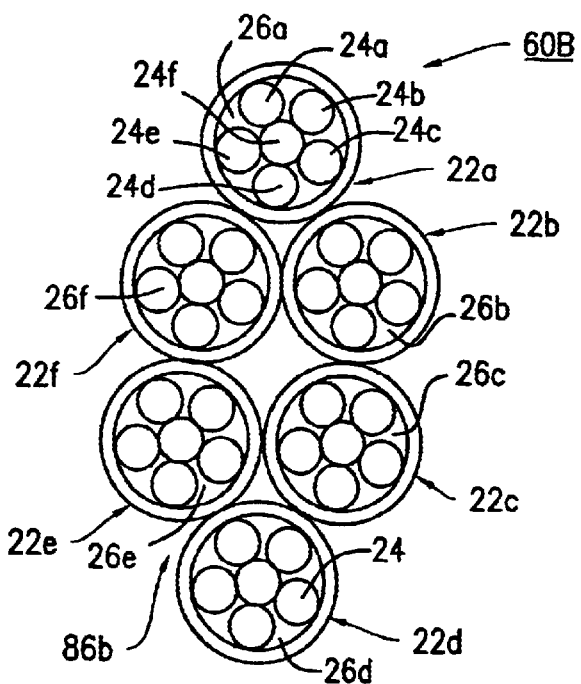
FIG. 12 is an enlarged cross-sectional view of the braided fiber optic strand assembly of the third alternate embodiment of the present invention taken along lines 12—12 of FIG. 11 showing the interrelationship of the six fiber optic strands in their braided configuration.
Figure 13:
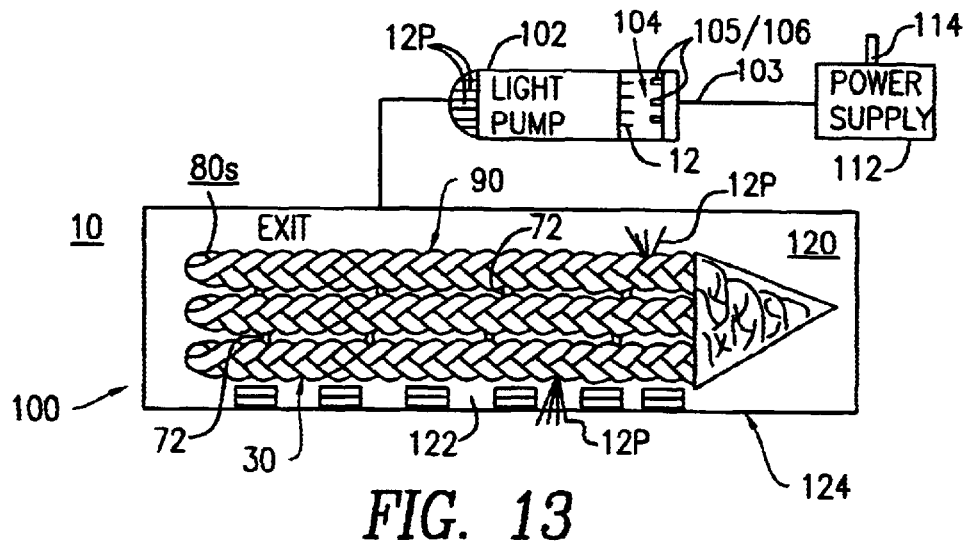
FIG. 13 is a front perspective view of the fiber optic light-emitting panel of the preferred embodiment of the present invention showing the power supply, the light pump having a light source, the fiber optic light-emitting panel having braided fiber strand assemblies therein, a mounting member, all being used as part of a road-sign lighting fixture.

The fiber optic light-emitting panel 10, having braided structures 30, 40, 50 or 60 therein, of the preferred and alternate embodiments of the present invention are represented in detail by FIGS. 1 through 16 of the drawings. The fiber optic light-emitting panel 10 of the preferred embodiment, as shown in FIGS. 1 through 6 of the drawings, includes a plurality of braided fiber optic strand assemblies 80S or 80B having a triple braid configuration 30S or 30B therein, using various forms of connection means 70 for forming a light-transmitting device 100. An example of a light-transmitting device 100 is a road-sign lighting fixture 120, as shown in FIG. 13 of the drawings.

Figure 11:
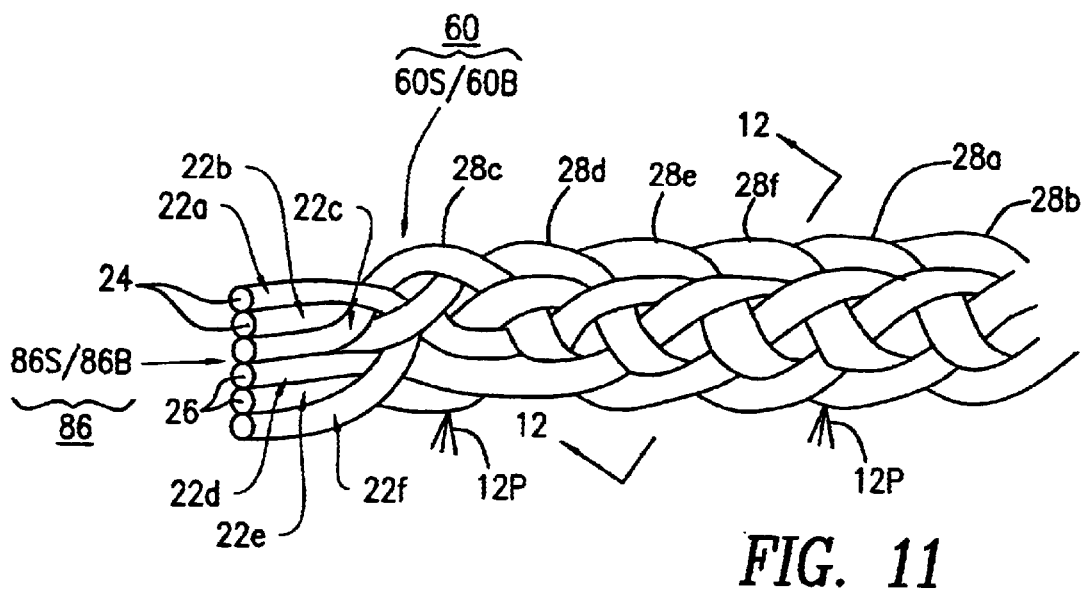
FIG. 11 is a front perspective view of the braided fiber optic strand assembly of the third alternate embodiment of the present invention showing six optic fiber strands braided together with each optic fiber strand having a plurality of bend section areas along the length of each optic fiber strand thereof for transmitting light beams laterally and outwardly at each of the bend section area locations.

Braided fiber optic strand assemblies 82S or 82B having a quadruple braid configuration 40S or 40B therein, respectively, as shown in FIGS. 7 and 8, include the braiding of four (4) strands 22 having optical fibers 24. Braided fiber optic strand assemblies 84S or 84B having a quintuple braid configuration 50S or 50B therein, respectively, as shown in FIGS. 9 and 10, include the braiding of five (5) strands 22 having optical fibers 24 therein. Braided fiber optic strand assemblies 86S or 86B having a sextuple braid configuration 60S or 60B therein, respectively, as shown in FIGS. 11 and 12, include the braiding of six (6) strands 22 having optical fibers 24 therein.

Each of these braided structures 30, 40, 50 or 60 of the fiber optic strand assemblies 80S, 80B, 82S, 82B, 84S, 84B, 86S or 86B may be used in the fiber optic light-emitting panel 10. The first, second and third alternate embodiments of braided structures 40, 50 and 60 operate and function in the same manner as the braided structure 30 of the fiber optic strand assemblies 80S or 80B for use in the fiber optic light-emitting panel 10 of the preferred embodiment.

The fiber optic light-emitting panel 10 having fiber optic strand assemblies 80S or 80B therein for use in light-transmission devices 100, are shown in FIGS. 13 through 16 of the drawings. These light-transmission devices 100 may include road-sign lighting fixtures 120, commercial sign lighting fixtures 130, backlighting systems 140, or stage/orchestra lighting systems 150. The fiber optic light-emitting panel 10 further includes a light pump apparatus 102 having a light source 104, a power supply 112, and an ON/OFF switch 114. Various light sources 104 may include light-emitting diodes (LEDs) 105, laser diodes 106, incandescent light bulbs 107, high intensity light bulbs 108, fluorescent light bulbs (lamps) 109, halogen lamps 110, such that these light sources 104 generate light beams 12 which are transmitted through the fiber optic strand assemblies 80S or 80B for emitting of light beams 12 from the various light-transmission devices 100 to illuminate a given area.

Detailed Description of the Preferred Embodiment 10

The fiber optic light-emitting panel 10 and its component parts of the preferred embodiment of the present invention are represented in detail by FIGS. 1 through 6 and 13 through 16 of the drawings.

In this specification a light-transmitting strand is defined as one optical fiber or multiple optical fibers forming a bundle. Thus, a triple braid 30 having three (3) strands consists of either three (3) optical fibers braided together or three (3) bundles of optical fibers braided together to form a braided fiber optic strand assembly 80S or 80B, respectively. A light-transmitting bundle is defined such that bundle 26 consists of two or more optical fibers 22 bound together. Therefore, a braid 20 may be formed from three (3) or more light-transmitting strands 22 braided together wherein each strand 22 consists of one optical fiber 24 braided together to form a braided fiber optic strand assembly 80S. Alternately, a braid 20 may be formed from three (3) or more light-transmitting bundles 26 braided together wherein each bundle 26 consists of two or more optical fibers 22 joined together, and the 3 or more bundles are braided together to form a braided fiber optic strand assembly 80B.

As shown in FIG. 1 of the drawings, a triple braid 30S has three (3) strands 22a, 22b and 22c formed of three (3) optical fibers 24a, 24b and 24c braided together to form a braided fiber optic strand assembly 80S. Alternately, as shown in FIGS. 2 and 4, the triple braid 30B has three (3) strands 22a, 22b and 22c formed of three (3) optical bundles 26a, 26b and 26c (each bundle 26a, 26b and 26c is made of multiple optical fibers 24 being 24a, 224b, 24c and 24d) braided together to form a braided fiber optic strand assembly 80B.

Each of the fiber optic strands 22a, 22b and 22c within the braided fiber optic strand assembly 80S includes at least (3) bend site locations per inch of the length of each strand 22a, 22b and 22c, respectively, for transmitting light beams 12 laterally and outwardly at each bend site location in order to illuminate a particular area. As shown in FIGS. 1, 2 and 3 of the drawings, each of the individual strands 22a, 22b and 22c includes the plurality of spaced-apart bend site locations 28a, 28b and 28c, respectively, thereon. Bend site locations 28a, 28b and 28c can have a range of three (3) to six (6) bends per inch being positioned on the braided strands 22a, 22b and 22c of the braided fiber optic strand assembly 80S or 80B, as shown in FIG. 3.

It should be noted that as the length of the strand assembly 80S extends further away from the light pump 102 the number of bends per inch may be increased to adjust for the light beam 12 attenuation in order to emit the same amount of light intensity along the entire length of the strand assembly 80S, such that the fiber optic panel 10 provides uniform illumination.

Figure 5:
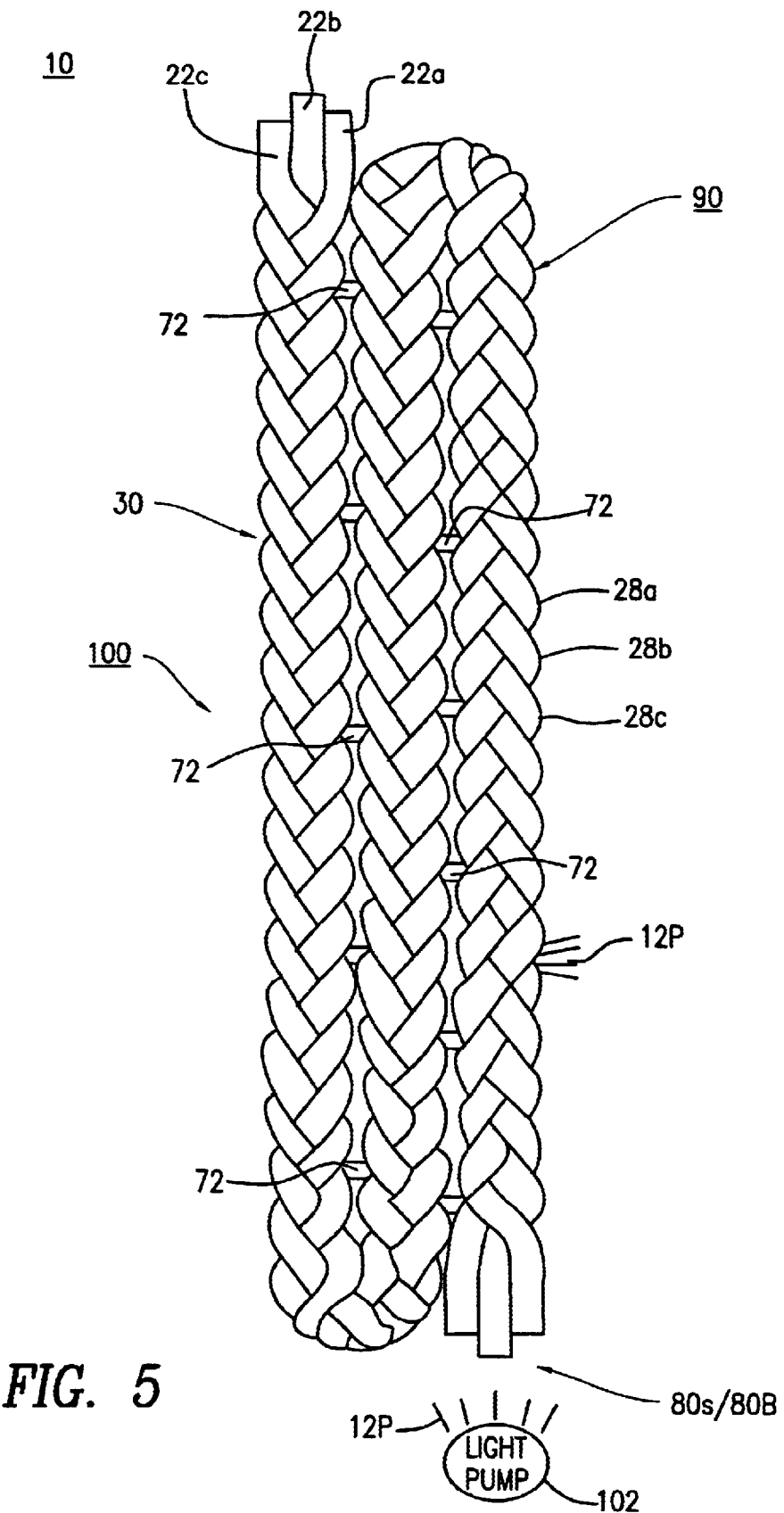
FIG. 5 is a top plan view of the fiber optic light-emitting panel of the preferred embodiment of the present invention showing a plurality of braided fiber strand assemblies connected by plastic ties being formed into a sheet.
Figures 6, 6A:
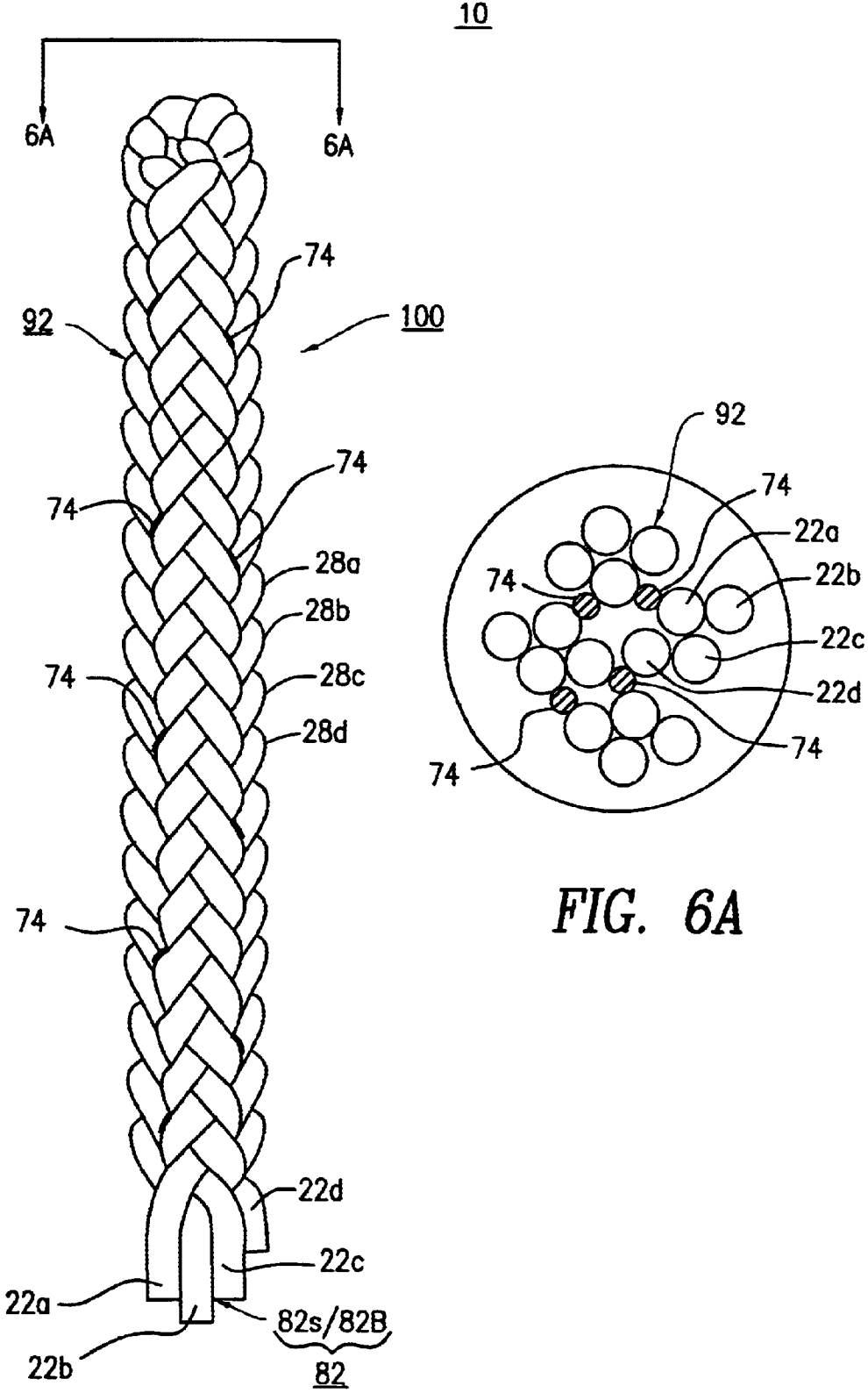
FIG. 6 is a front perspective view of the fiber optic light-emitting panel of the preferred embodiment of the present invention showing four braided fiber strand assemblies glued together and formed into a cylindrical column.
FIG. 6A is an enlarged cross-sectional view of the fiber optic light-emitting panel of the preferred embodiment of the present invention taken along lines 6A—6A of FIG. 6 showing four braided fiber strand assemblies glued together and formed into a cylindrical column.
Figure 16:
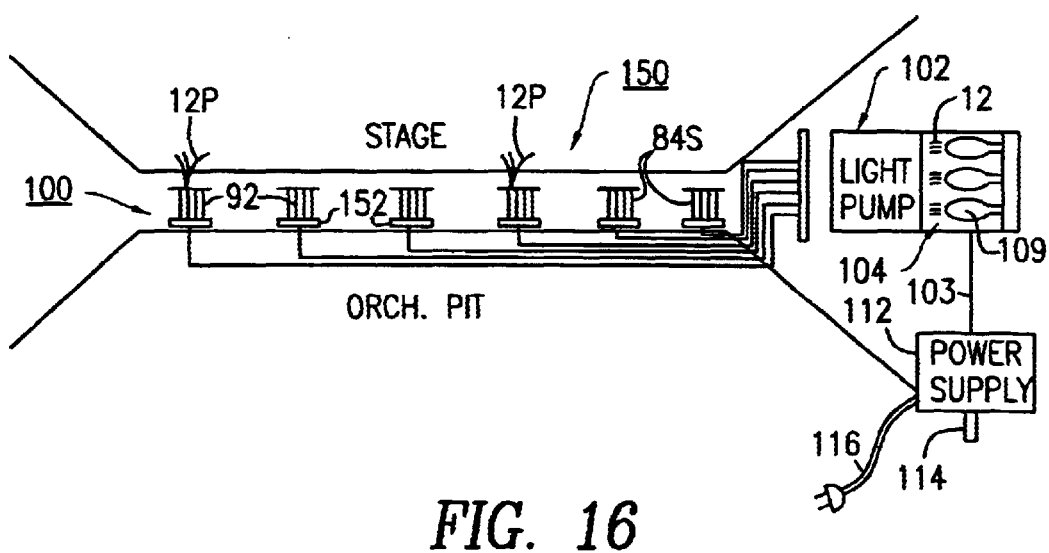

As shown in FIG. 5 of the drawings, fiber optic strand assemblies 80S or 80B may be connected together with plastic ties 72 to form a sheet 90, as part of light-emitting panel 10 for use in a light-transmitting device 100. Alternately, fiber optic strand assemblies 80S or 80B, as shown in FIG. 6 of the drawings, may be connected by gluing 74, stapling, laser fusion, heat bonding or the like to form a cylindrical structure 92 as part of the light-emitting component 10 for use in a light-transmitting device 100, such as the backlighting system 140 (FIG. 16).

It is understood that one or more of the strand or bundle assemblies 80S or 80B are connected to a light pump 102 for transmitting light 12 to each of the assemblies 80S or 80B, respectively, within the light-emitting panel 10 for use in a light-transmitting device 100.

Figure 14:
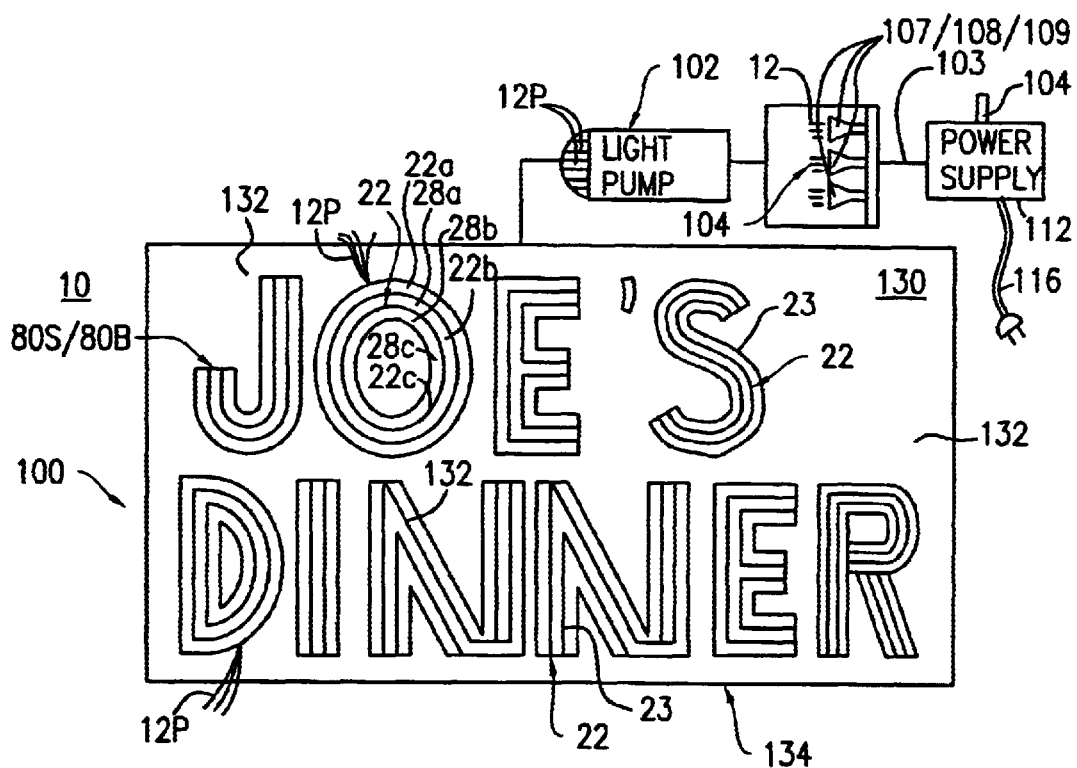
FIG. 14 is a front perspective view of the fiber optic light-emitting panel of the preferred embodiment of the present invention showing the power supply, the light pump having a light source, the fiber optic light-emitting panel having braided fiber strand assemblies therein, a mounting member, all being used as part of a diner's sign lighting fixture.

Additionally, strands 22 may include a phosphorous coating 23 for providing a luminescent lighting effect for replacement of conventional neon lighting devices (e.g. neon signs), as shown in FIG. 14 of the drawings.

Detailed Description of the Alternate Embodiments 40, 50, and 60

It is understood that a quadruple braid 40S, as shown in FIGS. 6, 7 and 8 of the drawings, has four (4) strands 22a, 22b, 22c and 22d formed of four (4) optical fibers 24a, 24b, 24c and 24d braided together to form a braided fiber optic strand assembly 82S. Alternately, the quadruple braid 40B has four (4) strands 22a, 22b, 22c and 22d formed of four (4) optical bundles 26a, 26b, 26c and 26d (each bundle 26a, 26b, 26c and 26d is made of multiple optical fibers 24) braided together to form a braided fiber optic strand assembly 82B, as shown in FIG. 8 of the drawings.

Each of the fiber optic strands 22a, 22b, 22c and 22d within the braided fiber optic strand assembly 82S or 82B includes at least (3) bend site locations per inch of the length of each strand 22a, 22b, 22c and 22d, respectively, for transmitting light beams 12 laterally and outwardly at each bend site location in order to illuminate a particular area. As shown in FIGS. 7 and 8 of the drawings, each of the individual strands 22a, 22b, 22c, and 22d includes the plurality of spaced-apart bend site locations 28a, 28b, 28c and 28d, respectively, thereon. Bend site locations 28a, 28b, 28c, and 28d can have a range of three (3) to six (6) bends per inch being positioned on the braided strands 22a, 22b, 22c and 22d of the braided fiber optic strand assembly 82S or 82B.

A quintuple braid 50S, as shown in FIGS. 9 and 10 of the drawings, has five (5) strands 22a, 22b, 22c, 22d and 22e formed of five (5) optical fibers 24a, 24b, 24c, 24d and 24e braided together to form a braided fiber optic strand assembly 84S. Alternately, the quintuple braid 50B has five (5) strands 22a, 22b, 22c, 22d and 22e formed of five (5) optical bundles 26a, 26b, 26c, 26d and 26e (each bundle 26a, 26b, 26c, 26d and 26e is made of multiple optical fibers 24) braided together to form a braided fiber optic strand assembly 84B, as shown in FIG. 10 of the drawings.

Each of the fiber optic strands 22a, 22b, 22c, 22d and 22e within the braided fiber optic strand assembly 84S or 84B includes at least (3) bend site locations per inch of the length of each strand 22a, 22b, 22c, 22d and 22e, respectively, for transmitting light beams 12 laterally and outwardly at each bend site location in order to illuminate a particular area. As shown in FIGS. 9 and 10 of the drawings, each of the individual strands 22a, 22b, 22c, 22d and 22e includes a plurality of spaced-apart bend site locations 28a, 28b, 28c, 28d and 28e, respectively, thereon. Bend site locations 28a, 28b, 28c, 28d and 28e can have a range of three (3) to six (6) bends per inch being positioned on the braided strands 22a, 22b, 22c, 22d and 22e of the braided fiber optic strand assembly 84S or 84B.

A sextuple braid 60S, as shown in FIGS. 11 and 12 of the drawings, has six (6) strands 22a, 22b, 22c, 22d, 22e and 22f formed of six (6) optical fibers 24a, 24b, 24c, 24d, 24e and 24f braided together to form a braided fiber optic strand assembly 86S. Alternately, the sextuple braid 60B has six (6) strands 22a, 22b, 22c, 22d, 22e and 22f formed of six (6) optical bundles 26a, 26b, 26c, 26d, 26e and 26f (each bundle 26a, 26b, 26c, 26d, 26e and 26f is made of multiple optical fibers 24) braided together to form a braided fiber optic strand assembly 86B, as shown in FIG. 12 of the drawings.

Each of the fiber optic strands 22a, 22b, 22c, 22d, 22e and 22f within the braided fiber optic strand assembly 86S or 86B includes at least (3) bend site locations per inch of the length of each strand 22a, 22b, 22c, 22d, 22e and 22f, respectively, for transmitting light beams 12 laterally and outwardly at each bend site location in order to illuminate a particular area. As shown in FIGS. 11 and 12 of the drawings, each of the individual strands 22a, 22b, 22c, 22d, 22e and 22f includes the plurality of spaced-apart bend site locations 28a, 28b, 28c, 28d, 28e and 28f, respectively, thereon. Bend site locations 28a, 28b, 28c, 28d, 28e and 28f can have a range of three (3) to six (6) bends per inch being positioned on the braided strands 22a, 22b, 22c, 22d, 22e and 22f of the braided fiber optic strand assembly 86S or 86B.

As the length of the braided fiber optic strand assemblies 82S or 82B, 84S or 84B, 86S or 86B of the braided structures 40, 50 and 60, respectively, extends further away from the light pump 102 the number of bends per inch may be increased to adjust for the light beam 12 attenuation in order to emit the same amount of light intensity along the entire length of the aforementioned braided fiber optic strand assemblies 82S, 82B, 84S, 84B, 86S or 86B such that the fiber optic panels 10 of the light-transmitting devices 100 provide uniform illumination.

In all other respects the braided structures 40, 50 and 60 of the first, second and third alternate embodiments using strand assemblies 82, 84 and 86, respectively, operate and function in the same manner as the braided structure 30 of the fiber optic strand assembly 80 for use in the light-transmitting devices 100 of the fiber optic light-emitting panels 10 of the preferred embodiment.

Operation of the Preferred Embodiment

In operation, the preferred and alternate embodiments of the fiber optic light-emitting panels 10 having one or more braided fiber optic strand assemblies 80, 82, 84 or 86 therein, as shown in FIGS. 1 through 16, all function and operate in a similar manner to produce a specific light pattern 12P from light beams 12. This applies whether the braided configurations are a triple braid 30, a quadruple braid 40, a quintuple braid 50, or a sextuple braid 60.

To produce a given light pattern or lighting effect 12P, the light pump 102 having a single light source or multiplie light sources 104 is turned ON via the ON/OFF power switch 114 of power supply 112 for activating the light-emitting panel 10 of the light-transmitting device 100. To produce a desired light pattern or lighting effect 12P, light source 104 can use different types of light-producing devices selected from the group consisting of LED's 105, laser diodes 106, incandescent light bulbs 107, high intensity light bulbs 108, fluorescent lamps 109, halogen lamps 110, neon lamps, laser diodes and the like. In addition, the number of bends 28 per inch within each fiber optic strand 22 for a specific braided fiber optic strand assembly 80 to 86 can be changed to provide the desired light pattern 12P produced by light-emitting panel 10 in a particular light-transmitting device 100.

For example, as shown in FIG. 14, the light beams 12 of the light pattern 12P are reflected from the phosphorous coating 23 of fiber optic strands 22 within braided strand assembly 80S or 80B from fluorescent lamp 109 to produce a luminescent lighting effect from the light beam 12 being emitted from the plurality of bend site locations 28a, 28b, 28c of the sign lighting fixture 130. In this manner, by increasing or decreasing the number of bend site locations 28a, 28b and 28c within each fiber optic strand 22a, 22b and 22c, respectively, and by changing the type of light source 104 being used, the specific light pattern 12P generated may be changed and used in various lighting applications, as previously mentioned.

The fiber optic light-emitting panels 10 of the preferred and alternate embodiments of the present invention have numerous applications, as shown in FIGS. 13 to 16 of the drawings, such as road-sign lighting fixtures 120, commercial sign lighting fixtures 130, backlighting systems 140 and stage/orchestra lighting systems 150. Other lighting applications for the present invention can include highway, street and sidewalk overhead lamps; portable emergency lights; photography lamps; home lighting fixtures; and flood lights.

As shown in FIG. 13, fixture 120 represents a road-sign lighting fixture. The road-sign lighting fixture 120 includes a power supply 112 having an activation switch 114 being electrically connected to a light pump apparatus 102 having a light source 104 therein via electrical line 103. Lighting fixture 120 further includes a mounting member 122 having thereon light-emitting panel in the form of a "directional arrow" made from a plurality of braided fiber optic strand assemblies 80S. All of the component parts of the light-emitting panel 10 are located and secured within a housing component 124 which is used as part of the road-sign lighting fixture 120.

As shown in FIG. 14, fixture 130 represents a commercial sign lighting fixture. The commercial sign lighting fixture 130 includes a power supply 112 having an activation switch 114 and an electrical plug 116 for connecting to AC/DC receptacle (not shown). The power supply 112 is electrically connected to a light pump apparatus 102 having a light source 104 therein via electrical line 103. Sign lighting fixture 130 further includes a mounting member 132 having thereon light-emitting panel in the form of script indicia "Joe's Diner" made from a plurality of braided fiber optic strand assemblies. All of the component parts of the light-emitting panel 10 are located and secured within a housing component 134 which is used as part of the commercial sign lighting fixture 130.

Figure 15:
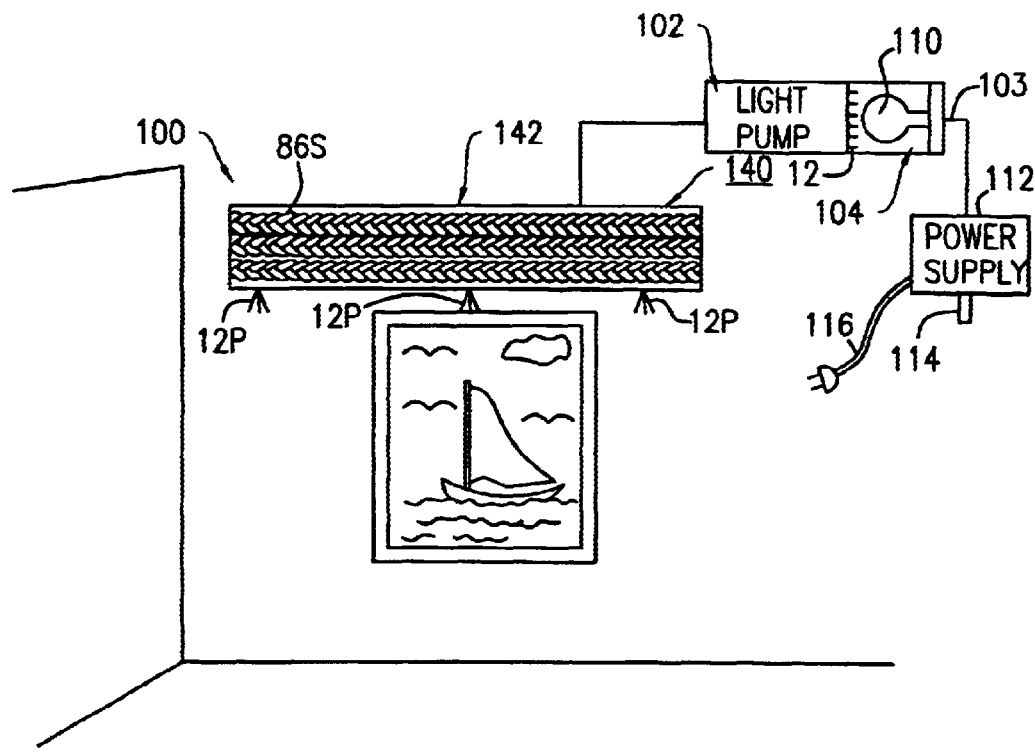

As shown in FIG. 15, fixture 140 represents a backlighting system. The backlighting system 140 includes a power supply 112 having an activation switch 114 and an electrical plug 116 for connecting to AC receptacle (not shown). The power supply 112 is electrically connected to a light pump apparatus 102 having a light source 104 therein via electrical line 103. Backlighting system 140 further includes an elongated backlighting fixture 142 having therein an elongated braided fiber optic strand assembly 86S as the fixture 142 light source for use in the lighting of a ceiling or wall in a particular area.

As shown in FIG. 16, item 150 represents a stage lighting system. The stage lighting system 150 includes a power supply 112 having an activation switch 114 and an electrical plug 116 for connecting to an AC/DC receptacle (not shown). The power supply 112 is electrically connected to a light pump apparatus 102 having a light source 104 therein via electrical line 103. Stage lighting system 150 further includes a plurality of stage lighting fixtures 152 each having therein cylindrical, braided fiber optic strand assemblies 84S as the fixture 152 light source for use in the lighting of the stage or orchestra areas in a theater.

Advantages of the Present Invention

Accordingly, an advantage of the present invention is that it provides for a fiber optic light-emitting panel having braided optical fiber bundles formed into a sheet in order to increase the amount of light emitted from each of the braided optical fibers within the bundle to provide an increase in efficiency of the light-emitting panel.

Another advantage of the present invention is that it provides for a fiber optic light-emitting panel having braided optical fiber bundles therein in order to produce a more luminous panel by bending the optical fibers along their length within the braided optical fiber bundles such that more light is emitted at the bends.

Another advantage of the present invention is that it provides for a fiber optic light-emitting panel having three (3) or more braided optical fibers within the optical fiber bundle in order to increase the light efficiency of light emissions from each of the bent optical fibers within the bundle.

Another advantage of the present invention is that it provides for a fiber optic light-emitting panel in which the frequency of bends of the optical fibers is in the range of three (3) to six (6) bends per inch of optical fiber.

Another advantage of the present invention is that it provides for a fiber optic light-emitting panel having a more uniform and directed amount of light being emitted in the X, Y and Z axis at each of the bends within the braided optical fiber bundles which produces a higher light output.

Another advantage of the present invention is that it provides for a fiber optic light-emitting panel in which the light output attenuation can be made relatively more uniform over substantially the entire length of the braided optical fibers by increasing the number of bends per inch in each optical fiber as the distance from the light source increases.

Another advantage of the present invention is that it provides for a fiber optic light-emitting panel having phosphorous-coated cladding of the braided optical fibers to produce a brighter light with a glowing effect when the light is leaked at each of the bends along the path of the braided optical fibers within the bundle of the light-emitting panel.

A further advantage of the present invention is that it provides for a fiber optic light-emitting panel having braided optical fibers for use as backlighting in museums, theaters, movies, art galleries, play houses, sport arenas, concert halls, amphitheaters, and the like, as well as a replacement for neon signs and other signs for buildings, roads, airports, and the like.

A still further advantage of the present invention is that it provides for a fiber optic light-emitting panel having braided optical fiber bundles formed into a sheet that can be mass produced in an automated and economical manner and is readily affordable by the user.

A latitude of modification, change, and substitution is intended in the foregoing disclosure, and in some instances, some features of the invention will. be employed without a corresponding use of other features. Accordingly, it is appropriate that the appended claims be construed broadly and in a manner consistent with the spirit and scope of the invention herein.

What is claimed is:

1. A fiber optic light-emitting panel having one or more braided fiber optic strand assemblies formed into a light-transmitting device, comprising:
    a) three or more fiber optic strands braided together to form a braided fiber optic strand assembly, each of said fiber optic strands including a single optical fiber or a plurality of optical fibers forming a bundle;
    b) each of said fiber optic strands within said braided fiber optic strand assembly having at least three (3) bends per inch along the length thereof for transmitting light laterally at said bends to form said light-transmitting device;

c) each of said fiber optic strands within said braided fiber optic strand assembly includes a phosphorous coating thereon for providing a luminescent lighting effect;

d) means for holding said one or more braided fiber optic strand assemblies to form said fiber optic light-emitting panel; and e) means for applying an optical light signal to said one or more braided strand assemblies for transmitting light from said bends of said fiber optic light-emitting panel.

2. A fiber optic light-emitting panel in accordance with claim 1, wherein said bends per inch have a range of three (3) to six (6) bends per inch along the length of each fiber optic strand within said braided fiber optic strand assembly.

3. A fiber optic light-emitting panel in accordance with claim 1, wherein said means for holding include plastic ties, gluing, stapling, laser fusion or heat bonding.

4. A fiber optic light-emitting panel in accordance with claim 1, wherein said means for applying an optical light signal to said braided assemblies includes a light pump having a light source therein.

5. A fiber optic light-emitting panel in accordance with claim 4, wherein said light source includes light-producing devices selected from the group consisting of an incandescent bulb, a high intensity light bulb, a fluorescent lamp, a halogen lamp, a light-emitting diode, a neon lamp, or a laser diode.

6. A fiber optic light-emitting panel in accordance with claim 1, wherein said fiber optic light-emitting panel is formed into a planar sheet or a cylindrical structure by said means for holding.

7. A fiber optic light-emitting panel in accordance with claim 1, wherein said braided fiber optic strand assembly includes three fiber optic strands braided together.

8. A fiber optic light-emitting panel in accordance with claim 1, wherein said braided fiber optic strand assembly includes four fiber optic strands braided together.

9. A fiber optic light-emitting panel in accordance with claim 1, wherein said braided fiber optic strand assembly includes five fiber optic strands braided together.

10. A fiber optic light-emitting panel in accordance with claim 1, wherein said braided fiber optic strand assembly includes six fiber optic strands braided together.

11. A fiber optic light-emitting panel in accordance with claim 1, wherein said braided fiber optic strand assembly of said light-transmitting device is used as part of a road-sign lighting fixture.

12. A fiber optic light-emitting panel in accordance with claim 1, wherein said braided fiber optic strand assembly of said light-transmitting device is used as part of a commercial sign lighting fixture.

13. A fiber optic light-emitting panel in accordance with claim 1, wherein said braided fiber optic strand assembly of said light-transmitting device is used as part of a backlighting system.

14. A fiber optic light-emitting panel in accordance with claim 1, wherein said braided fiber optic strand assembly of said light-transmitting device is used as part of a stage lighting system.

15. A braided fiber optic strand assembly for use as a light-transmitting device, comprising:

a) three or more fiber optic strands braided together to form a braided fiber optic strand assembly, each of said fiber optic strands including a single optical fiber or a plurality of optical fibers forming a bundle;

b) each of said fiber optic strands within said braided fiber optic strand assembly having at least three (3) bends per inch along the length thereof for transmitting light laterally at said bends to form said light-transmitting device;

c) each of said fiber optic strands within said braided fiber optic strand assembly includes a phosphorous coating thereon for providing a luminescent lighting effect; and d) means for applying an optical light signal to said braided fiber optic strand assembly for transmitting light from said bends of said light-transmitting device.

16. A braided fiber optic strand assembly in accordance with claim 15, wherein said bends per inch have a range of three (3) to six (6) bends per inch along the length of each fiber optic strand within said braided fiber optic strand assembly.

17. A braided fiber optic strand assembly in accordance with claim 15, wherein said means for holding include plastic ties, gluing, stapling, laser fusion or heat bonding.

18. A braided fiber optic strand assembly in accordance with claim 15, wherein said means for applying an optical light signal to said braided strand assemblies includes a light pump having a light source therein.

19. A braided fiber optic strand assembly in accordance with claim 18, wherein said light source includes light-producing devices selected from the group consisting of an incandescent bulb, a high intensity light bulb, a fluorescent lamp, a halogen lamp, a light-emitting diode, a neon lamp, or a laser diode.

20. A braided fiber optic strand assembly in accordance with claim 15, wherein said braided fiber optic strand assembly is formed into a planar sheet or a cylindrical structure by said means for holding.

21. A braided fiber optic strand assembly in accordance with claim 15, wherein said braided fiber optic strand assembly includes three fiber optic strands braided together.

22. A braided fiber optic strand assembly in accordance with claim 15, wherein said braided fiber optic strand assembly includes four fiber optic strands braided together.

23. A braided fiber optic strand assembly in accordance with claim 15, wherein said braided fiber optic strand assembly includes five fiber optic strands braided together.

24. A braided fiber optic strand assembly in accordance with claim 15, wherein said braided fiber optic strand assembly includes six fiber optic strands braided together.

25. A braided fiber optic strand assembly in accordance with claim 15, wherein said braided fiber optic strand assembly of said light-transmitting device is used as part of a road-sign lighting fixture.

26. A braided fiber optic strand assembly in accordance with claim 13, wherein said braided fiber optic strand assembly of said light-transmitting device is used as part of a commercial sign lighting fixture.

27. A braided fiber optic strand assembly in accordance with claim 15, wherein said braided fiber optic strand assembly of said light-transmitting device is used as part of a backlighting system.

28. A braided fiber optic strand assembly in accordance with claim 15, wherein said braided fiber optic strand assembly of said light-transmitting device is used as part of a stage lighting system.

* * * * *